United States Patent [19]
Deutsch et al.

[11] Patent Number: 4,821,498
[45] Date of Patent: Apr. 18, 1989

[54] MOISTENER PAD FOR A COTTON HARVESTER

[75] Inventors: Timothy A. Deutsch, Newton; Russell D. Copley, Ankeny, both of Iowa

[73] Assignee: Deere & Company, Moline, Ill.

[21] Appl. No.: 935,459

[22] Filed: Nov. 26, 1986

[51] Int. Cl.⁴ .............................................. A01D 46/16
[52] U.S. Cl. ............................................ 56/50; 56/41
[58] Field of Search ................ 56/41, 50, DIG. 12, 56/28; 401/207, 196, 140

[56] References Cited

U.S. PATENT DOCUMENTS

| | | | |
|---|---|---|---|
| 1,863,106 | 6/1932 | Gimonet | 401/196 |
| 2,593,671 | 4/1952 | Hagen et al. | 56/44 |
| 2,884,754 | 5/1959 | Bornzin et al. | 56/41 |
| 3,328,830 | 7/1967 | Corwin | 401/207 |
| 4,611,941 | 9/1986 | Karliner et al. | 401/207 |

*Primary Examiner*—Paul J. Hirsch

[57] ABSTRACT

A moistener pad including two sets of apertures extending diagonally from corner to corner of the pad to define X-shaped pattern which provides a uniform distribution of moistening fluid to the fins. One set of apertures is located between a first set of adjacent pairs of fins, and the other set of apertures is located between a second set of adjacent pairs of fins.

8 Claims, 2 Drawing Sheets

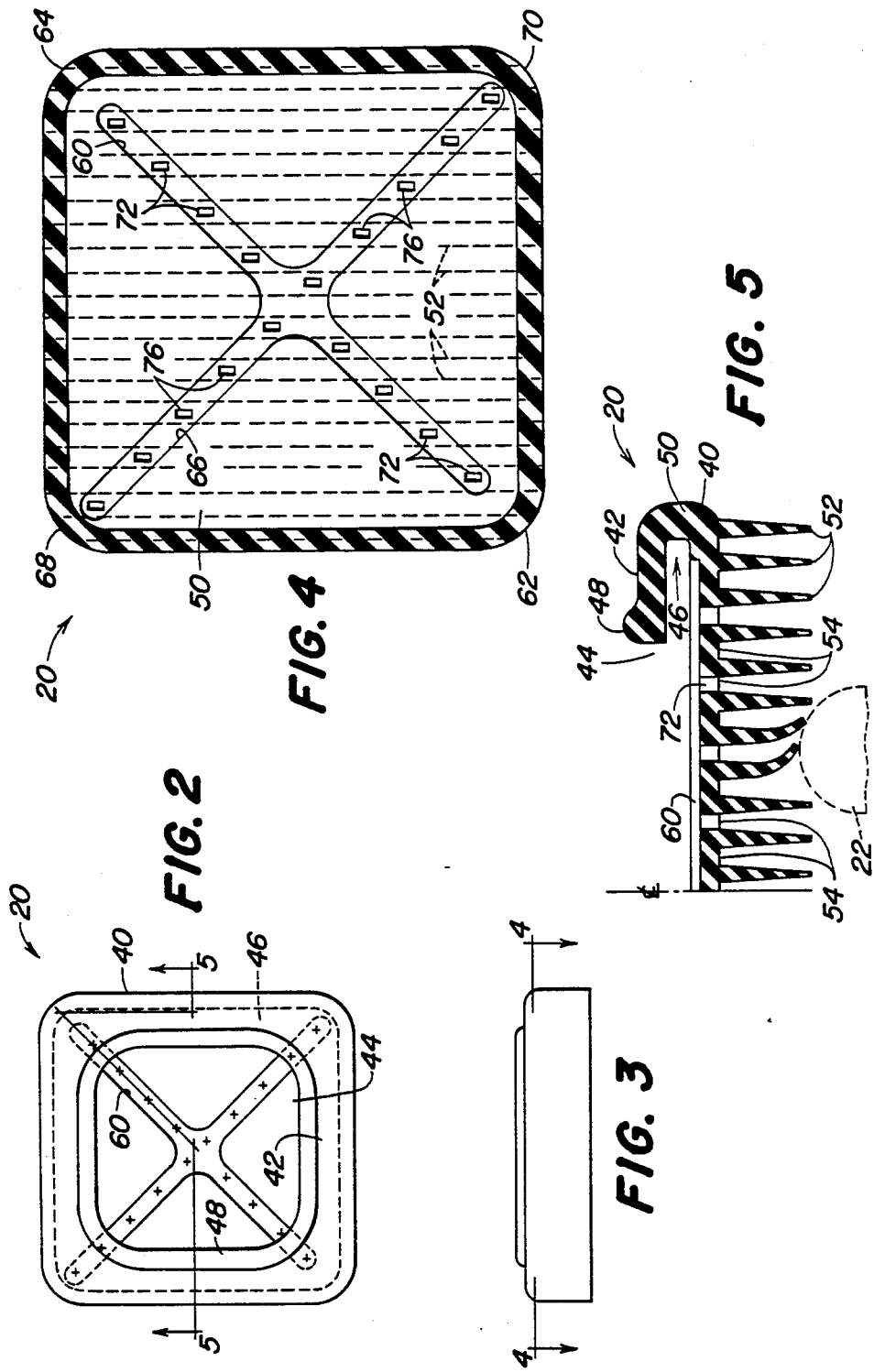

MOISTENER PAD FOR A COTTON HARVESTER

BACKGROUND OF THE INVENTION

The present invention relates generally to a cotton picker, and more specifically to a moistener pad for supplying moisture to the picker spindles.

Presently available cotton pickers of the type exemplified by the John Deere Model 9940 Cotton Picker include a plurality of upright picker drums having picker spindles mounted in upright columns on picker bars. The picker spindles are rotated under moistener pads supported in a column on a moistener pad assembly adjacent each drum. The pads are mounted in cantilever fashion from an upright member and fluid such as water from a distributor located at the top of the member is communicated to the pad through a plurality of flexible hoses. Each pad typically includes a base which connects the pad to the holder assembly, and a plurality of fins extending downwardly from the base in parallel relationship for contacting and wiping the spindles. A single line of apertures located in the middle of the pad communicates fluid from the flexible tubing to only about half the fins. As the spindles sweep under the fins, fluid is distributed to the remaining fins, and the spindles are moistened. Such a spindle moistener pad structure is shown, for example, in U.S. Pat. No. 2,369,708.

Drawbacks of such prior art devices are lack of uniformity in the distribution of the liquid along the fins of the pad because of the aperture configuration, and higher distribution of liquid in the pads near the lower end of the assembly as compared with the pads near the upper end of the assembly because some of the fluid from the upper pads tends to drip down on the lower pads. Often the fluid on the pads is concentrated near the center of the pads and on the fins adjacent the apertures which feed the fluid from the flexible tubing to the fins. As a result, the spindles are not adequately moistened and cleaned by the pads, which results in less efficient doffing of the spindles and reduced productivity.

OBJECTS OF THE INVENTION

It is therefore an object of the present invention to provide an improved moistener pad for a cotton picker. It is another object to provide such a pad which keeps spindles cleaner and improves doffing while requiring no more fluid than with previously available pads.

It is a further object of the invention to provide an improved moistener pad which provides more efficient distribution of the moistener fluid for better moistening and cleaning of the spindles than at least most previously available pads.

It is yet another object of the present invention to provide an improved spindle moistener pad which provides a more effective distribution of the moistener fluid, even toward the upper end of the moistener pad assembly to provide more effective and efficient moistening of the spindles.

It is yet another object of the present invention to provide an improved spindle moistener pad for a cotton picker wherein substantially all of the fins on the pad receive fluid directly, and the distribution of the fluid throughout the pad is more uniform than with at least most of the previously available moistener pads.

BRIEF DESCRIPTION OF THE INVENTION

In accordance with the above objects, a moistener pad is provided having a base of generally rectangular configuration and a plurality of spaced fins extending downwardly from the base parallel to one of the sides of the base. A first shallow channel extends diagonally across the pad from one corner to the opposite corner. A second channel extends diagonally between the remaining corners and forms an X-shaped pattern with the first channel. Apertures are formed in the channels to communicate fluid received at the top portion of the base through to the area between fins. The apertures are arranged such that along one diagonal channel, the back side of the pad is opened through to the area between approximately every other pair of adjacent fins. The apertures in the remaining diagonal channel are situated to open the back side of the pad to the area between the remaining sets of fins. The aperture pattern provides fluid flow through to the fin areas from corner to corner and along the entire pad so that more uniform and effective spindle moistening is provided, even on the pads near the top of the moistener pad assembly. Therefore, the pads keep the spindles cleaner using no more water than with previous designs. The spindles are more evenly moistened, making doffing easier, and productivity is increased.

These and other objects, features and advantages of the present invention will become apparent to one skilled in the art upon reading the following detailed description in view of the drawings.

BRIEF DESCRIPTION OF THE DRAWINGS

FIG. 2 is a top view of a moistener pad constructed in accordance with the teachings of the present invention for utilization with the moistener assembly of FIG. 1.

FIG. 3 is a side view of the pad of FIG. 2.

FIG. 4 is a sectional view of the moistener pad taken substantially along lines 4—4 of FIG. 3.

FIG. 5 is a view taken generally along lines 5—5 of FIG. 2.

DESCRIPTION OF THE PREFERRED EMBODIMENT

Figure 1:
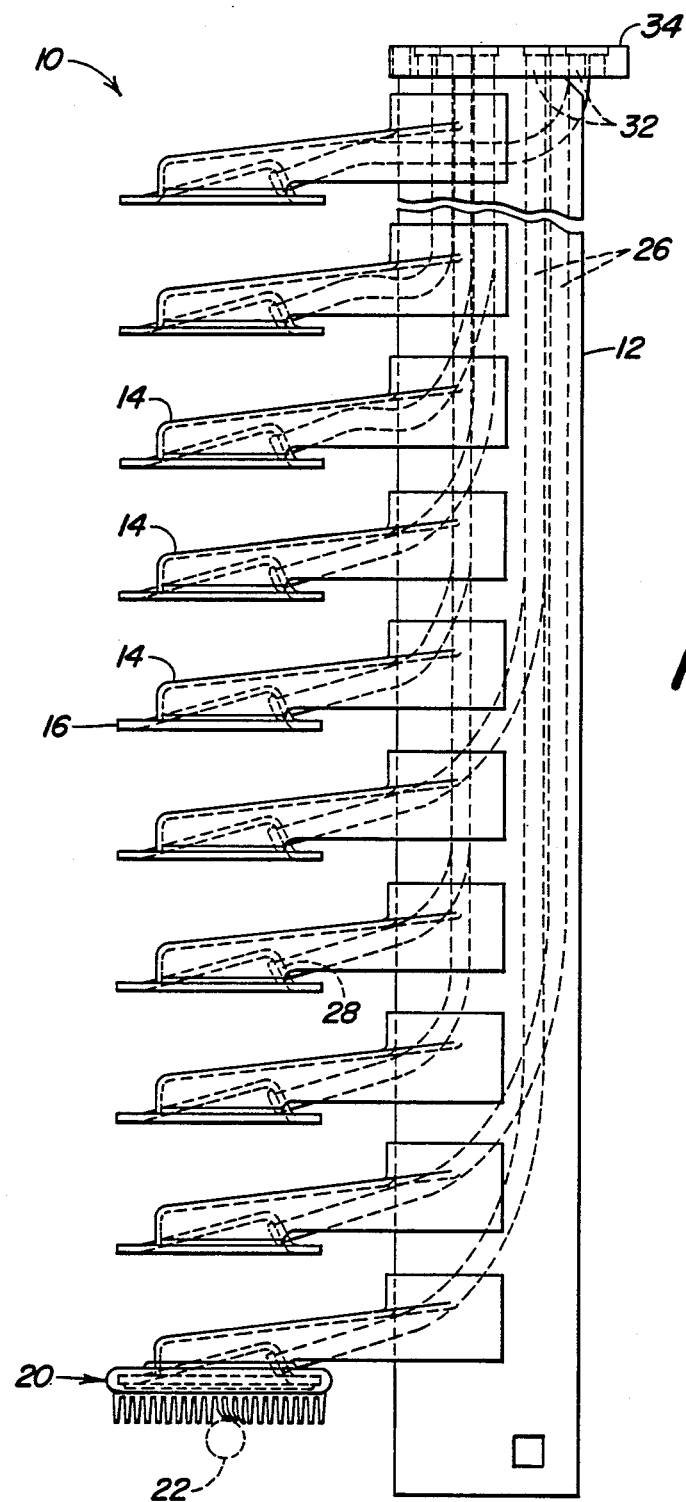
FIG. 1 is a side view of a cotton picker moistener assembly.

Referring now to FIG. 1, therein is shown a moistener assembly 10 including an upright column 12 supporting a plurality of uniformly spaced holder assemblies 14, each having a pad-receiving structure 16 for receiving a moistener pad 20 and supporting the pad 20 in the path of rotating spindles 22. A plurality of flexible tubes 26 extend through the column and include an outlet end 28 opening above the pad-receiving structure 16 and an inlet end 32 opening into a fluid distributor 34. A low-volume spray of moistener fluid is applied to the distributor 34 by a fluid jet (not shown), and the fluid enters the inlet ends 32 of the tubes 26 and moves under the influence of gravity through the tubes 26 and through the outlet ends 28 into the moistener pads 20. The pads 20 then deliver the moistening fluid to the spindles 22 as the spindles brush against the pads. The moistener assembly 10 is generally of conventional construction, except for the moistener pads 20, and therefore the assembly is described only in sufficient detail to orient the moistener pad structure of the present invention.

The moistener pad 20 includes a base 40 generally rectangular in configuration (FIG. 2), and includes an upper inwardly directed flange 42 extending around the entire periphery of the base. The flange 42 defines an opening 44 having dimensions slightly smaller than the dimensions of the pad-receiving structure 16. The flange 42 also defines an area 46 in the base which conforms to the periphery of the structure 16 and is received thereon when the pad 20 is mounted on the holder assembly 14 by stretching the opening 44 and forcing the pad onto the structure 16. A tight fit is provided between the area 46 and the structure 16 to positionally secure the pad 20 on the holder assembly 14. An enlarged, rounded portion 48 extends upwardly from the inner edge of the flange 42 for a more secure fit and to prevent tearing of the flange during mounting.

The base 40 includes a lower fin-supporting portion 50. Tapered fins 52 extend downwardly from the portion 50 and are formed integrally therewith in generally parallel, uniformly spaced relation. As shown, the fins 52 extend parallel to one set of opposed sides of the pad 20 substantially along the entire length of the pad. The fins 52 are spaced to define flat, open areas 54 at the bottom of the portion 50 which extend parallel to the fins 52 substantially the length of the pad 20.

A first shallow channel 60 is formed in the top of the fin supporting portion 50 and extends diagonally between corner 62 and 64 of the pad 20. A second shallow channel 66 extends diagonally between the remaining corners 68 and 70. As shown, the channels have a generally rectangularly cross-section with a depth less than about one half the thickness of the fin-supporting portion 50. Small rectangular slots 72 extend through the portion 50 from the bottom of the channel 60 to the areas 54 between every other pair of adjacent fins 52. The length of the slot 72 extends in the same direction as the fins 52 and the width of the slot, as best seen in FIG. 5, is approximately equal to the spacing between the base of the fins. A generally identical set of rectangular slots 76 extend through the portion 50 from the bottom of the channel 66 to the area 54 between the remaining alternate pairs of fins 52. Therefore, a fluid path is provided from the top of the base 40 through to about approximately every area 54 between the fins 52. The slots 72 and 76 which, as best seen in FIG. 4, extend from corner to corner to provide good fluid distribution along the entire fin area.

In operation moistener fluid is provided through the flexible tubes 26 and exits the outlet end 28 of each of the tubes into the corresponding top area of the base 40 which defines a fluid receiving area for the mositener pad 20. The fluid moves in the channels 60 and 66 and through the rectangular slots 72 and 76 between the adjacent pairs of fins 52. As the spindle 22 rotates past the pad 20, the fins 52 wipe the spindle and fluid flowing between the fins moistens the spindle. The generally X-shaped alternating configuration of slots 72 and 76 provides good distribution of the fluid in the fins 52 without weakening of the central portion of the base 50 which might otherwise occur with one set of slots aligned along a single path.

Having described the preferred embodiment, it will be apparent that modifications can be made without departing from the scope of the invention as defined in the accompanying claims.

We claim:

1. A cotton picker spindle moistener pad having a generally rectangular base with a top and a bottom, flexible fins extending downwardly from the bottom of the base, the top of the base including a fluid receiving area for receiving moistener fluid and distributing the fluid downwardly between the fins, a first channel area located in the top of the base and extending diagonally generally from one corner of the base to the opposite corner, said channel area including apertures extending through the base and opening between the fins, and a second channel area extending diagonally generally from one of the remaining corners to the opposite remaining corner and forming a generally X-shaped pattern in the top of the base, said second channel area including apertures extending through the base and opening between the fins.

2. The invention as set forth in claim 1 wherein the apertures in the first mentioned channel area are located between a first set of adjacent pairs of fins, and the apertures in the second channel area are located between a second set of adjacent pairs of fins to thereby provide a path for fluid to substantially all the fins.

3. The invention as set forth in claim 1 wherein the fins are generally equally spaced and extend parallel to one side of the base, and the apertures are rectangular in shape and have a width approximately equal to the spacing between the fins.

4. The invention as set forth in claim 3 wherein the base has a predetermined thickness and the depth of the channel is substantially less than half said predetermined thickness.

5. A cotton picker spindle moistener pad having a base with two pairs of opposed sides and two pairs of diagonally opposed corners, said pad adapted for mounting adjacent a source of moistener fluid, rows of generally parallel fins extending downwardly from the base between one of the pairs of sides, said base including a plurality of apertures for communicating fluid from the source of fluid to the fins, wherein said apertures extend substantially from one of the corners of the pad to the corresponding opposed corner, said apertures extending diagonally to the fins and opening adjacent approximately each of the fins for providing fluid directly to substantially all the fins.

6. The invention as set forth in claim 5 wherein the base is rectangular and the apertures are located in a fluid-receiving channel area in the base.

7. The invention as set forth in claim 6 wherein the base includes two sets of apertures including a first set of apertures extending diagonally between one pair of corners and a second set of apertures extending diagonally between the remaining pair of corners.

8. The invention as set forth in claim 7 wherein each set of apertures opens into a corresponding set of fins, the set of the fins corresponding to the first set of apertures differing from the set of fins corresponding to the second set of apertures.

* * * * *